US011928861B1

(12) United States Patent
Vellanki et al.

(10) Patent No.: US 11,928,861 B1
(45) Date of Patent: Mar. 12, 2024

(54) GENERATING MAPPING INFORMATION BASED ON IMAGE LOCATIONS

(71) Applicant: DOORDASH, INC., San Francisco, CA (US)

(72) Inventors: Sushil Vellanki, Freemont, CA (US); Kuleen Nimkar, Oak Park, IL (US); Li Xiang Tian, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 359 days.

(21) Appl. No.: 17/075,175

(22) Filed: Oct. 20, 2020

(51) Int. Cl.
*G06V 20/20* (2022.01)
*G01C 21/36* (2006.01)
*G06N 20/00* (2019.01)
*G06V 20/00* (2022.01)
*G06V 20/10* (2022.01)

(52) U.S. Cl.
CPC ......... *G06V 20/20* (2022.01); *G01C 21/3667* (2013.01); *G06N 20/00* (2019.01); *G06V 20/176* (2022.01); *G06V 20/38* (2022.01)

(58) Field of Classification Search
CPC ......... G06T 19/006; G06T 17/05; G06T 7/70; G06T 7/73; G06T 2207/30; G06T 2207/30244; G06T 2207/10; G06T 2207/10016; G06F 16/20; G06F 16/29; G06F 16/90; G06F 16/95; G06F 16/953; G06F 16/9537; G06F 16/951; H04W 4/02; H04W 4/029; G06V 20/20; G06V 20/10; G06V 20/176; G06V 20/182; G06V 20/188; G06V 20/194; G06Q 30/02; G01C 21/00; G01C 21/20; G06K 9/00
See application file for complete search history.

(56) References Cited

U.S. PATENT DOCUMENTS

| | | | | |
|---|---|---|---|---|
| 9,342,900 | B1* | 5/2016 | Shekar | G06F 18/22 |
| 2004/0110113 | A1* | 6/2004 | Huang | G09B 19/00 |
| | | | | 434/100 |
| 2016/0058288 | A1* | 3/2016 | DeBernardis | A61B 5/0075 |
| | | | | 600/477 |
| 2016/0373647 | A1* | 12/2016 | García Morate | H04N 23/635 |
| 2017/0178310 | A1* | 6/2017 | Gormish | G06T 7/30 |
| 2018/0121875 | A1* | 5/2018 | Kipust et al. | G06Q 10/08355 |
| | | | | 705/338 |
| 2018/0285653 | A1* | 10/2018 | Li et al. | G06V 20/52 |
| | | | | 382/101 |
| 2019/0026532 | A1* | 1/2019 | Feingersh | G06T 7/0002 |
| 2019/0286124 | A1* | 9/2019 | Schubert et al. | G05D 1/106 |
| | | | | 701/425 |

(Continued)

*Primary Examiner* — Gandhi Thirugnanam
(74) *Attorney, Agent, or Firm* — MATTINGLY & MALUR, PC

(57) ABSTRACT

In some examples, a computer system may receive an image and associated location information corresponding to a location at which the image was captured. The system may provide the image as input to a machine-learning model previously trained to determine whether the received image includes a threshold amount of information to indicate that received location information indicates a location corresponding to the received image. Based at least in part on an output of the machine-learning model indicating that the received image meets the threshold, the system may store the associated location information as mapping information associated with the location.

20 Claims, 9 Drawing Sheets

(56) References Cited

U.S. PATENT DOCUMENTS

2020/0074386 A1* 3/2020 Edwards et al. ..... G06Q 10/083
  705/330
2022/0019829 A1* 1/2022 Tal ..................... G06V 20/58
2022/0254045 A1* 8/2022 Boardman ............. G06T 17/00

* cited by examiner

GENERATING MAPPING INFORMATION BASED ON IMAGE LOCATIONS

BACKGROUND

An agent may deliver items to a customer at a delivery location. However, in the case of apartment complexes, condominium housing, or other dense housing locations, a mapping source that provides a map to the agent with directions to the delivery location may not have sufficiently high resolution information to identify the correct location for a particular housing unit. Instead, for instance, the mapping information may point to the management office of the housing complex or some other random location on the premises. Thus, an agent may need to spend additional time locating and traveling to the particular housing unit at which the delivery is to be made. Alternatively, in some cases, the agent may leave the item at the management office, may leave the item at an incorrect location indicated by the mapping source, or may perform other actions that might provide a substandard result. Similar difficulties may be encountered in some types of office complexes, motels, hotels, or other types of densely populated locations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
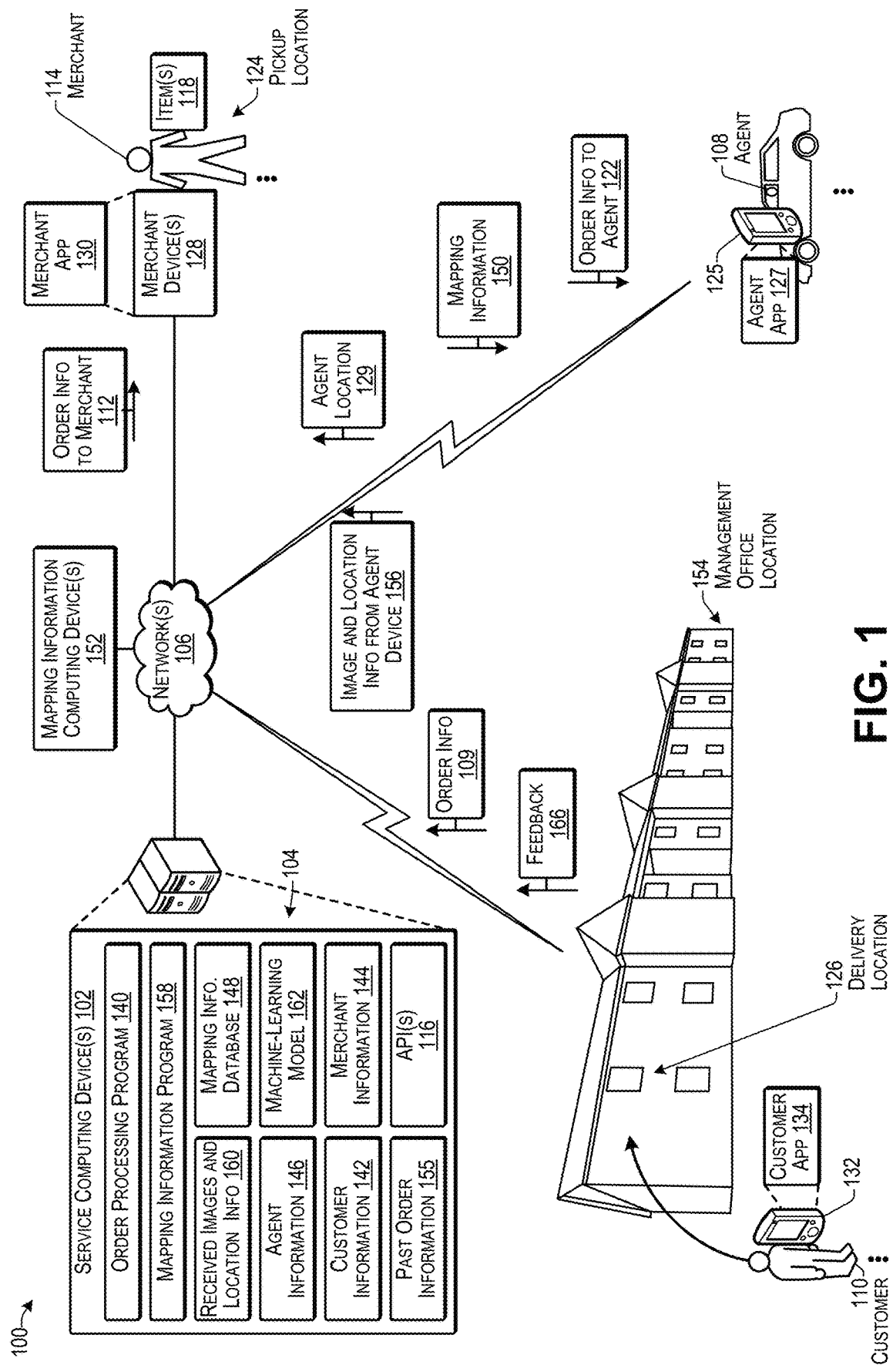
FIG. 1 illustrates an example distributed computing system able to generate and utilize high-resolution mapping information according to some implementations.

Some implementations herein provide techniques and arrangements for generating high-resolution (high-definition) mapping information based in part on photographs and associated location information. Further, some examples may include training and employing a machine-learning model useable for determining, based in part on a received photograph, whether received location information should be added to a mapping database including the high-resolution mapping information for a particular location. Implementations herein solve the technical problem of augmenting low-resolution maps by increasing the accuracy of mapping information in a mapping information database for densely populated locations.

In some examples, the system may receive, from an agent, an image (e.g., a photograph, video, etc.) and associated latitude and longitude information captured by the agent device when the image is taken for a correct delivery location. The system may provide the received image as an input to a machine-learning model for determining whether the image has sufficient information for trusting the latitude and longitude information that is associated with the image. If so, the latitude and longitude information may be associated with the delivery location and the customer account in a mapping information database. The image itself may be subsequently discarded from the service computing devices.

The next time a customer places an order for delivery to the same delivery location, the mapping location information associated with the delivery location in the mapping information database may be accessed and provided to the agent application of a selected agent that will be performing the delivery. For example, the agent application executing on the agent device of the selected agent may receive the provided mapping information and may accurately display the specific delivery location on a map presented in a user interface (UI) of the agent device.

Examples herein may employ a trained machine-learning model to determine a valid latitude and longitude corresponding to an actual delivery location. The machine-learning model may be trained using a large number of images received from a plurality of agents for distinguishing trustworthy images from untrustworthy images. For instance, the images used for training the machine-learning model may be limited to images that include sufficient information in the image itself to indicate that the image and associated location information are for the correct location. When the machine-learning model has been trained and deployed, the machine-learning model may accept or reject images received from the agents based on the amount of information included in the images. For images that are accepted, the associated location information may be added to the mapping information database for use as high-resolution mapping data for densely populated locations.

In some cases, the system may subsequently use the determined location information for specifying locations on maps, such as delivery locations during future deliveries to densely populated locations. The system may further receive additional images and location information from additional agents that make deliveries to the same delivery location. Thus, the system herein is able to continuously improve and refine the accuracy of the high-resolution mapping information. For example, Global Positioning System (GPS) receivers and other Global Navigation Satellite System (GNSS) receivers (hereinafter collectively referred to as "GPS receivers") may not always provide extremely accurate readings, particularly when indoors, such as in a hallway, or in downtown areas with a large number of tall buildings. Accordingly, as additional agents deliver additional items to the same delivery location, and each agent provides an additional image and corresponding location information (e.g., latitude and longitude) for the same location, the system may perform an averaging and/or clustering of the collected location information to arrive at a consensus location for the delivery location based on the plurality of different location indications received from the plurality of different agent devices. Thus, by continually increasing the accuracy and resolution of the mapping information, and subsequently providing the mapping information to agent devices, the system herein may significantly reduce incidences in which items are left at the wrong location or otherwise not properly delivered.

For discussion purposes, some implementations herein are described in conjunction with a service that includes an agent network of a plurality of agents that are paid to pick up and deliver items. Customers may place orders through the service for desired items from the merchants, and the agents deliver the items to the customers at delivery locations indicated by or otherwise associated with the customers. The system may determine high-resolution mapping information for specific delivery locations based in part on the latitudes and longitudes associated with images captured by agents during prior deliveries to the delivery locations. Further a trained machine-learning model may be employed for determining which captured images are valid and, thereby, may determine which corresponding received high definition location information to associate with a respective delivery location. Further, while some examples are described in use with a delivery service, implementations herein are not limited to use with a delivery service, and may be implemented with other systems, services, and the like.

FIG. 1 illustrates an example distributed computing system 100 able to generate and utilize high-resolution mapping information according to some implementations. For instance, the system 100 may enable one or more service computing devices 102 associated with a service provider 104 to generate mapping information for densely populated locations based on image and location information received over one or more networks 106 from one or more agents 108. The generated mapping information may be subsequently provided to the agents 108, such as for use in making subsequent deliveries to the delivery locations based on the generated mapping information.

For discussion purposes, some example implementations are described in the environment of one or more service computing devices 102 that manage a network of agents 108 for delivering items to customers 110 in high density housing locations and other densely populated locations. However, implementations herein are not limited to the particular examples provided, and may be extended to other service environments, other system architectures, other types of agents, other types of deliveries, other types of mapping information, and so forth, as will be apparent to those of skill in the art in light of the disclosure herein.

In the illustrated example, the service computing devices 102 may be configured to provide a service to receive, over the one or more networks 106, order information 109 from a customer 110. For instance, the order information 109 may include an indication of an item and an indication of a delivery location. The delivery location may be explicitly specified with the order information or, alternatively, may be implied to be a default delivery location already associated with a customer account of the customer 110. Based on the order information 109 received from the customer 110, the service computing device 102 may send order information 112 to at least one particular merchant 114 of a plurality of merchants that will provide a requested item 118. The particular merchant 114 may receive the order information 112, and may respond with a confirmation to confirm that the request for the item 118 has been received and the item 118 will be provided by the merchant 114.

In response to receiving the confirmation from the particular merchant 114, the service computing device 102 may send order information 122 to an agent device 125 of a selected agent 108 who, upon accepting the delivery job, will pick up the order from the merchant 114 and deliver the order to the customer 110. For instance, each merchant 114 may be associated with a respective pickup location 124, which may typically be the merchant's place of business. Furthermore, each customer 110 may be associated with a respective delivery location 126, which as mentioned above, may be determined by the service computing device 102 when the order information 109 is received from the customer 110.

The order information 122 sent to the agent device 125 may include item information, the pickup location 124 for the order, the pickup time, the delivery location 126, and a delivery time for the order. Further, while one agent 108, one customer 110, and one merchant 114 are shown in this example for clarity of illustration, a large number of agents 108, customers 110, and merchants 114 may individually participate in the system 100.

In the illustrated example, the service computing device 102 of the service provider 104 is able to communicate with the agent device 125 over the one or more networks 106. Each agent 108 may be associated with a respective agent device 125 that may execute a respective instance of an agent application 127. For example, the agents 108 may use agent devices 125, such as smart phones, tablet computers, wearable computing devices, laptops, or the like, as further enumerated elsewhere herein, and these agent devices 125 may have installed thereon the agent application 127. The agent application 127 may be configured to receive the order information 122 from the service computing device 102 to provide a particular agent 108 with information for picking up a particular order from a merchant's pickup location 124 and for delivering the order to a customer's delivery location 126. The agent application 127 may further enable the agent 108 to respond to the service computing device 102 to confirm acceptance of a delivery job.

Additionally, in some cases, the agent application 127 may provide the service computing device 102 with an indication of a current agent location 129 of a particular agent 108. For example, the agent application 127 may obtain the current location from a GPS receiver (not shown in FIG. 1) included onboard the agent device 125. As mentioned above, the term "GPS" as used herein may include any global navigation satellite system (GNSS) such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), any other satellite-based location positioning system, or any similar such system for providing accurate indications of current location to a mobile device. Accordingly the GPS receiver herein may be able to determine the location 129 (e.g., latitude and longitude) of the agent device 125 based on received signals from one or more satellite positioning systems or the like. Additionally, in some examples, the agent application 127 and the service computing device 102 may communicate with each other via one or more application programming interfaces (APIs) 116.

Each merchant device 128 may be associated with a respective merchant 114. Each merchant device 128 may be a computing device, such as a desktop, laptop, tablet, smart phone, or the like, and may include a respective instance of a merchant application 130 that executes on the respective merchant device 128. For example, the merchant application 130 may be configured to communicate with the service computing device 102, such as for receiving the order information 112 and for sending a confirmation. In some examples, the merchant application 130 and the service computing device 102 may communicate with each other via one or more APIs 116.

In addition, the customers 110 may be associated with respective customer devices 132 that may execute respective instances of a customer application 134. For example, the customers 110 may use the customer devices 132, such as smart phones, tablet computers, wearable computing devices, laptops, desktops, or the like, and these customer devices 132 may have installed thereon or may otherwise access the customer application 134. The customer application 134 may enable the customer 110 to select one or more items 118 to purchase from one or more of the merchants 114 to be delivered to the customer 110 by one or more of the agents 108. For example, the customer application 134 may present one or more UIs on a display of the agent device 132 for enabling the customer 110 to select one or more items 118 for an order. In some examples, the customer application 134 and the service computing device 102 may communicate with each other via one or more APIs 116. Additionally, or alternatively, the customer application 134 may be a browser, or the like, and the customer 110 may navigate to a website or load a web application associated with the service provider 104, and may use the website or web application received from the service computing device(s) 102 to place an order.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH®; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant device(s) 128, the customer device(s) 132, and/or the agent device(s) 125 are able to communicate over the one or more networks 106 using wired or wireless connections and combinations thereof.

In the illustrated example, the service computing device 102 includes an order processing program 140 that may be executed on the service computing device 102 to provide, at least in part, the functionality attributed to the service computing device 102. The order processing program 140 may receive the order information 109 from the customer 110 and may associate the order information 109 with customer information 142 and merchant information 144. For instance, based on customer identifying information that may be included with the order information 109, the order processing program 140 may associate particular order information 109 with a particular customer account. Further, based on a particular merchant 114 identified by the order information 109, the order processing program 140 may associate the order information 109 with a merchant account of a particular merchant 114 to send the order information 112 to the merchant 114.

In addition, the order processing program 140 may access agent information 146 to determine agent contact information for sending the order information 122 to a particular agent 108 to determine whether the particular agent 108 is willing to accept the delivery job of delivering the order to the customer 110. The particular agent 108 may use the agent application 127 on the agent device 125 to receive a message with information about the order, and to respond with acceptance of the delivery job if the job is accepted. The particular agent 108 may subsequently pick up the order from the particular merchant 114 and deliver the order to the particular customer 110 at a specified delivery location 126.

In the case of high density housing locations and other densely populated locations, the agent 108 may be provided with high resolution mapping information retrieved by the order processing program 140 from a mapping information database 148 if the high resolution mapping information has already been generated for the specified delivery location 126. For example, the service computing device may maintain the mapping information database 148, which may be a relational database or any other suitable type of data structure. The mapping information database may include high resolution mapping information previously determined for delivery locations in densely populated locations for past orders. When the order information 109 is received from the customer device 132, the order processing program 140 may correlate the customer account and/or a specified delivery location with the mapping information database 148 to determine whether any high resolution mapping information has been stored in relation to the delivery location and/or the customer account.

If it already exists in the mapping information database, the high resolution mapping information may be included with mapping information 150 sent to the agent application 127 executing on the agent device 125. For example, the agent application 127 may receive the high resolution mapping information and the agent application 127 may use the high resolution mapping information to generate a UI including a map indicating the delivery location 126. As one example, the service computing device 102 may provide all the mapping information for generating the map in the UI on the agent device. As another example, the agent application 127 or the service computing device 102 may provide the high-resolution mapping information to a third party mapping information computing device 152 that may provide the mapping information 150 to the agent device 125 to enable presentation of a UI with a map to the delivery location 126.

Alternatively, if high resolution mapping information has not yet been generated for the specified delivery location 126, the mapping information 150 provided to the agent device 125 may instead be low resolution mapping information that may indicate a delivery location that does not coincide with the actual delivery location 126 specified by the customer 110. As one example, suppose that the mapping information 150 indicates that a management office location 154 is the delivery location on the map in the UI generated on the agent device. In this case, the agent may proceed to the indicated location and follow a procedure such as that described additionally below with respect to FIGS. 2-7, to generate high resolution mapping information for the delivery location 126.

In either case, when the agent 108 has completed delivery of the order to the delivery location 126, the agent 108 may use the agent application 127 to inform the order processing program 140 that the delivery has been completed. Upon receiving the indication of completion, the order processing program 140 may store information related to the order and completion of the order as past order information 155.

In addition, in association with providing notification of order completion, the agent 108 may capture an image of the delivery location 126, and may include in the image the item 118 delivered to the delivery location 126. Furthermore, at least one of the agent application 127 or a separate camera application may be used to capture the image, and may be configured to access the GPS receiver on the agent device 125 when the image is captured and may associate a detected latitude and longitude with the captured image. The agent application 127 may send the image and location information 156 from the agent device 125 to the service computing device 102 over the one or more networks 106.

The order processing program 140 may receive the image and location information 156 from the agent device 125 and may provide this received information to a mapping information program 158 that may be executed on the one or more service computing devices 102. For example, the mapping information program 158 may receive the image and location information 156 and may temporarily store the image and location information with received images and location information 160. The mapping information program 158 may correlate the received information with the customer account and/or the delivery location 126 in the customer information 142.

In addition, the mapping information program 158 may use the received image as input to a machine-learning model 162. The machine learning model 162 may be executed to determine whether to rely on the location information included with the received image of a delivery location for generating high-resolution mapping information. For instance, the machine-learning model 162 may be trained to account for pieces of information included in the received images. In some cases, the machine-learning model may be initially trained using a set of training data. For example, the machine-learning model 162 may be trained using training data that includes previously received images for a large number of past orders included in the past order information 155. The trained machine learning model 162 may be checked for accuracy using another portion of past order information 155, and may then be deployed for use in determining whether received images include a threshold amount of information for a delivery location to trust that the associated location information indicates the correct delivery location. The machine-learning model 162 may be periodically updated and re-trained based on new training data to keep the machine-learning model 162 up to date and accurate.

As one example, a received image may be determined by the machine-learning model 162 to include at least the threshold amount of information if the received image includes an image of an entrance or other entryway, doorway, etc., of an apartment unit, condominium unit, townhouse, house, an office, a motel room, or other densely populated high occupancy structure. As one non-limiting example, a received image that includes at least a portion of a door and doorframe of the delivery location and the delivered item 118 in the received image might be determined to have the threshold amount of information in some cases.

Further, as another example, the received image may include an apartment number, suite number, room number, or other identifying alphanumeric information indicating a distinct unit number corresponding to the delivery location. For instance, the machine-learning model 162 may be trained to recognize the identifying alphanumeric information in a received image. The machine-learning model 162 or an associated algorithm included in the mapping information program 158 may perform character recognition on the alphanumeric information included in the received image, and may compare the recognized character(s) with the delivery address or other previously provided delivery location information to determine whether the alphanumeric information recognized in the received image matches a unit number in the delivery address information provided by the customer. If so, this may weigh strongly in favor of the image including the threshold amount of information. On the other hand, if the alphanumeric information recognized in the received image does not match the provided delivery address, then this may weigh strongly against the image being determined to include the threshold amount of information despite the image including an entrance, door, delivered item, etc.

In some cases, if a matching unit number is identified in a received image, then a higher level of confidence may be associated with the received location information for that image. On the other hand, if the image does not include a matching unit number, then lower levels of confidence may be associated with the received location information depending on the amount of other information included in the respective images. Nevertheless, if the received image is determined to have at least the threshold amount of information to be trustworthy (e.g., with a higher level of confidence or a lower level of confidence), the associated location information (e.g., a latitude and longitude associated with the received image) may be added to the mapping information database 148 and associated with the delivery location 126, such as by being associated with a delivery address and a unit number, or the like. Subsequently, the stored latitude and longitude information for the delivery location 126 may be used to provide high resolution mapping information to an agent 108 the next time an item is ordered for delivery to that particular delivery location 126. On the other hand, if the machine learning model 162 determines that a received image does not include at least the threshold amount of information, the location information received with that image is not added to the mapping information database 148.

In addition, in some examples, the service computing device 102 may receive feedback 166 from the customer application 134 on the customer device 132. For example, the customer may send feedback 166 such as in the form of structured or unstructured data indicating that the item was not received or that the item was left at the incorrect location. In this event, the mapping information program 158 may receive the feedback 166 and may determine whether location information was stored to the mapping information database 148 based on the delivery for which the feedback 166 was received. If so, the mapping information program 158 may remove the mapping information generated for the particular delivery location 126 from the mapping information database 148 based on the feedback 166 indicating that the item was left at the wrong address or not received.

Figure 2:
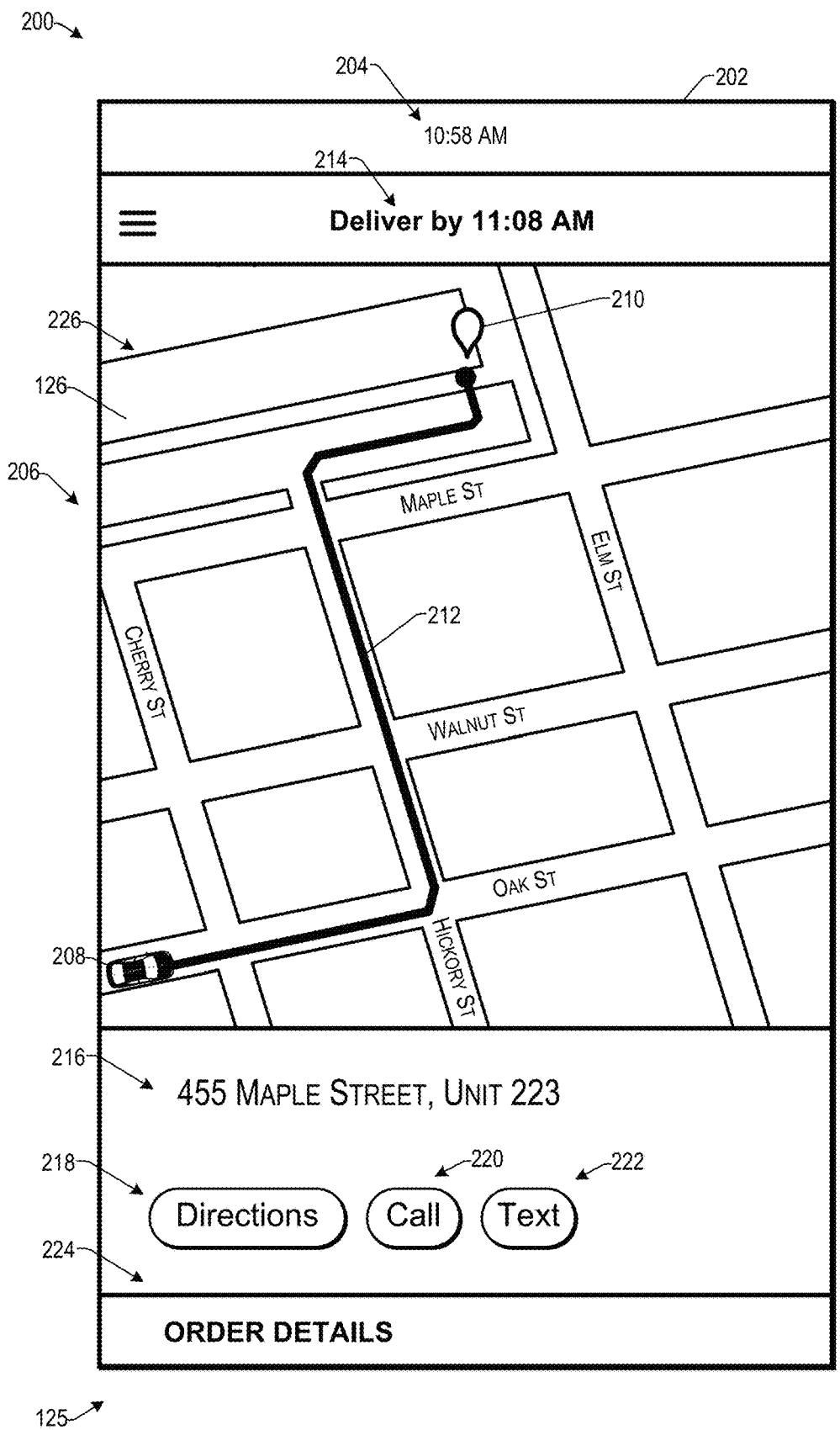
FIG. 2 illustrates an example user interface presented on an agent device according to some implementations.

FIG. 2 illustrates an example user interface 200 presented on an agent device 125 according to some implementations. In the illustrated example, the agent device 125 may execute the agent application 127 (not shown in FIG. 2) to present the user interface 200 on a display 202 of the agent device 125. The agent device 125 may further present a current time 204 on the display 202.

The user interface 200 includes a map 206 that may include a first icon 208 representative of a current indicated location of the agent device 125 in relation to the map 206. For instance, the current location of the agent device 125 may be determined by the agent application 127, such as based on GPS information or other location information received from the agent device 125, e.g., from a GPS receiver included in the agent device 125. The map 206 may further present a second icon 210, such as a pin or the like, corresponding to a target location to which the agent is instructed to proceed to perform a delivery. The user interface 200 may further present an indicated route 212 on the map 206 for the agent to follow to navigate from the current location to the target location represented by the second icon 210.

The user interface 200 may further include an indication of a delivery time 214 by which the agent is expected to deliver an item to the delivery location of the customer who placed the order for the item being delivered. In addition, the user interface 200 may present a text version 216 of the delivery location, as well as several other virtual controls, such as buttons. Examples of virtual controls include a first virtual control 218 selectable for accessing text directions from the current location 208 to the mapped target location 210. The virtual controls may further include a second virtual control 220 that may be selectable for calling the customer for the current delivery, and a third virtual control 222 that may be selectable for sending a text message to the customer. In addition, a fourth virtual control 224 may be selectable to view details of the order that the agent is currently delivering.

The illustrated example may correspond to the situation discussed above with respect to FIG. 1 in which the agent has been provided low-resolution mapping information for the delivery location in a densely populated location 226, such as an apartment complex, condominium complex, office building, or the like. For instance, the low-resolution mapping information indicates that the delivery location is at the location indicated by the pin 210, when the delivery location is actually at a location indicated by reference character 126. Accordingly, when the agent arrives at the densely populated location 226, the agent may need to search for the delivery location 126, or call or text the customer to receive additional directions to the delivery location 126. Nevertheless, when the agent locates the correct delivery location 126, the agent may provide location information to the service computing device 102 to enable generation of the high resolution mapping information for the delivery location 126 as discussed additionally below.

Figure 3:
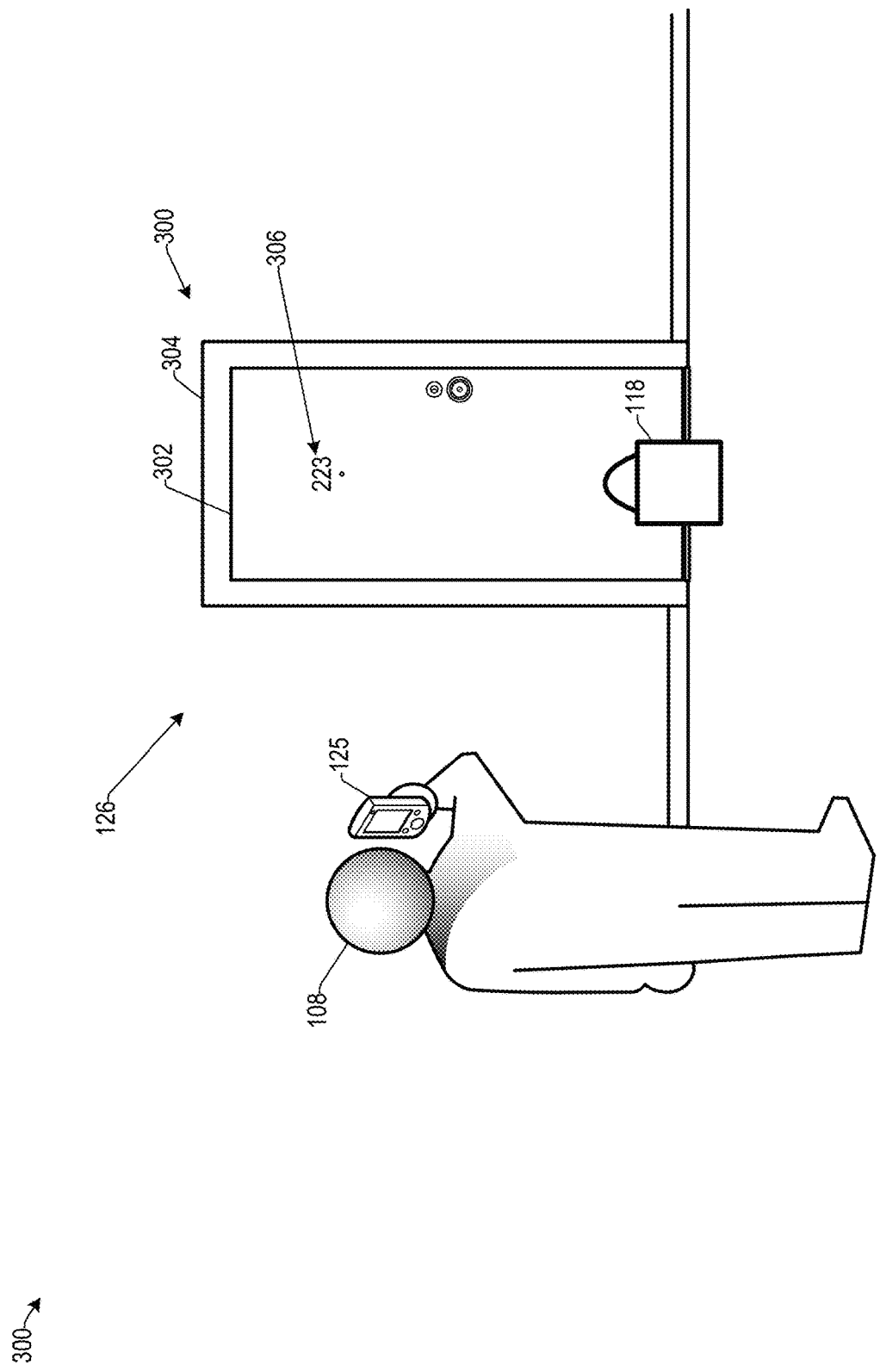
FIG. 3 illustrates an example of an agent performing a drop off including capturing an image and location information according to some implementations.

FIG. 3 illustrates an example 300 of an agent 108 performing a drop off including capturing an image and location information according to some implementations. In this example, suppose that the agent 108 has located the correct delivery location 126 for the current delivery. In addition, suppose that the agent 108 has been instructed to leave the item 118 at the door 302 of the delivery location 126, rather than handing off the item 118 to the customer 110 in person. For example, for some types of deliveries, the agent 108 may leave the item 118 at the delivery location 126 without interacting with the customer 110, such as for social distancing purposes (e.g., contactless delivery) or if the customer is not home or is otherwise unavailable. In such situations, the agent 108 may take a photograph or otherwise capture an image of the item 118 left at the delivery location 126. The image may be forwarded to the customer application 134 on the customer device 132 to let the customer know that the item has 118 been delivered and to give the customer 110 a visual indication of the current location of the item 118.

When capturing the image, the agent 108 may try to capture the entire door 302, doorframe 304, unit number 306, etc., in the image to attempt to obtain as much identifying information as possible in the image. In addition, the image may include the item 118 delivered to the delivery location and left at the door 302. When the agent 108 has captured the image of the delivery location 126, the agent application 127 (or a camera application in other examples) may determine the current latitude and longitude of the agent device 125. The agent application 127 may associate this information with the image captured by the agent 108. The agent application 127 may send the image and the associated latitude and longitude location to the service computing device 102 as discussed above. Additionally, in some examples, the agent application 127 may also access an altimeter on the agent device 125 and may include an altitude of the agent device 125 with the latitude and longitude information, thereby providing location information for the delivery location 126 in 3D space. Additionally, or alternatively, in some examples, the GPS information provided by the GPS receiver may be sufficiently accurate to provide a determination of altitude in addition to an indication of latitude and longitude.

In some examples, the image and location information may be transmitted immediately to the service computing device 102 over the one or more networks 106. Furthermore, in some examples, the mapping information program 158 may input the received image into the machine learning model 162 discussed above with respect to FIG. 1. In some cases, if the received image is determined by the machine learning model 162 to be of insufficient quality, e.g., not containing sufficient information for the associated location information to be considered trustworthy, the mapping information program 158 may send an electronic communication to the agent device 125 indicating that the agent 108 should retake the image of the delivery location. This checking of the image and sending the communication to the agent may take place in real time in some examples. Furthermore, in some cases, this process may be repeated until the received image is determined by the machine learning model 162 to include sufficient verifiable information.

Figures 4A, 4B, 4C:
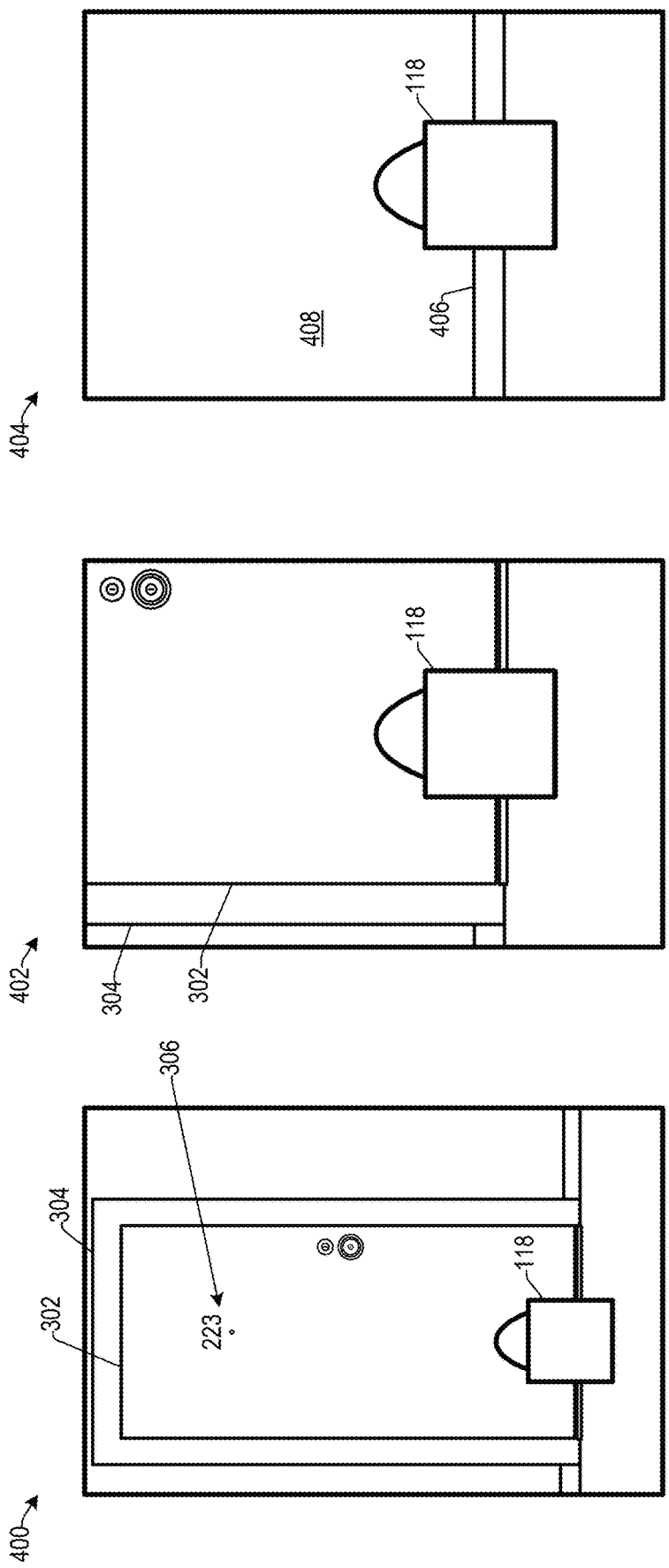
FIGS. 4A, 4B and 4C illustrate example images according to some implementations.

FIGS. 4A, 4B, and 4C illustrate example images received from agent devices according to some implementations. As illustrated in FIG. 4A, a received image 400, includes the entire door 302 and doorframe 304, as well as the item 118 and other features, such as the unit number 306. Accordingly in some examples, the received image 400 may be input to the machine-learning model 162 and may be determined by the machine learning model 162 to have at least a threshold amount of information indicative of the delivery location that may be deemed sufficient for trusting the location information associated with the received image 400 with a higher level of confidence. For example, the received image 400 may be determined by the machine-learning model 162 to include at least the threshold amount of information based on the received image including an image of an entrance or other entryway, doorway, etc., of an apartment unit, condominium unit, townhouse, house, an office, a motel room, or other densely populated high occupancy structure.

In addition, the received image 400 also includes the unit number 306 in the image 400. Thus, the machine-learning model 162 may recognize the alphanumeric information in the received image 400 as a unit number. The machine-learning model 162, or an associated algorithm included in the mapping information program 158, may perform character recognition on the alphanumeric information, and may compare the recognized character(s) with a unit number included in the delivery address or other previously provided delivery location information to determine whether the alphanumeric information recognized in the received image 400 matches the unit number in the delivery address information provided by the customer. If the recognized unit number 306 matches the delivery information received from the customer, then a higher level of confidence may be accorded to the location information received with the image 400. Accordingly, based on the higher level of confidence, the location information associated with the received image 400 may be added to the mapping information database 148 and associated with the delivery location, e.g., the specific address and unit number, or the like, for future use in navigating to the same delivery location.

FIG. 4B illustrates a received image 402 that includes the item 118 in the image 402, but includes only a portion of the door 302 and a portion of the doorframe 304, and does not include the unit number or any other identifying alphanumeric information. Nevertheless, in some examples herein, the machine learning model 162 may determine that the received image 402 includes a threshold amount of information (e.g., portion of the door, doorframe, and the item) for using the received location information, but with a lower level of confidence. Accordingly, based on the amount of information in the image 402 exceeding the threshold, but with a lower level of confidence, the location information associated with the received image 400 may be added to the mapping information database 148 and associated with the delivery location. However based on the lower level of confidence, when a new image is received for the same delivery address, such as the next time a delivery is made to that delivery location, if the newer image has a higher level of confidence, then the location information associated with the newer image may replace the location information associated with the image 402 in the mapping information database 148.

FIG. 4C illustrates a received image 404 that includes the item 118 in the image 404, but includes only a baseboard 406 and wall 408, and does not include a door, doorframe, unit number, or any other identifying alphanumeric information. Consequently, in some examples herein, the machine learning model 162 may reject the received image 404 as being of low quality and including less than the threshold amount of information sufficient for trusting the location information received with the image 404. In this case, the location information received with the image 404 may be discarded or otherwise not associated with the delivery location in the mapping information database 148.

Figure 5:
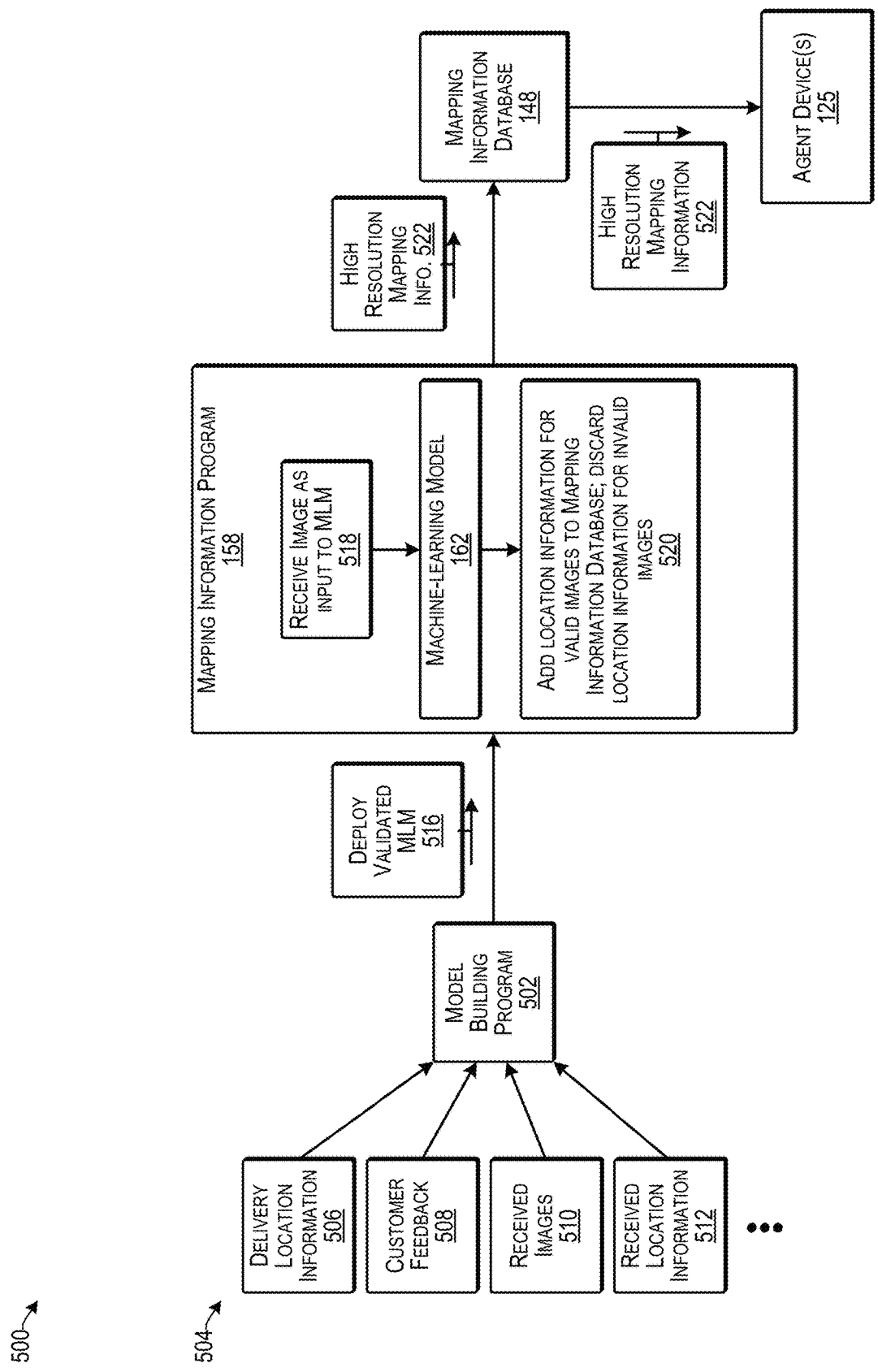
FIG. 5 is a block diagram illustrating an example framework for training and deploying a machine learning model for generating high-resolution mapping information based on received images and associated location information according to some implementations.

FIG. 5 is a block diagram illustrating an example framework 500 for training and deploying the machine learning model 162 for generating high-resolution mapping information based on received images and associated location information according to some implementations. In this example, a model building program 502 may receive training data 504 for training the machine learning model 162. Suitable machine-learning models for some examples herein may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, deep-learning neural networks, and so forth.

Examples of training data 504 that may be used for training the machine learning model 162 include delivery location information 506, customer feedback 508, received images 510, and received location information 512. For instance, the delivery location information 506 may indicate whether associated training data is for a densely populated location or not. For example, training data corresponding to delivery locations that are not densely populated may not be suitable for use in training the machine learning model 162. Furthermore, the customer feedback 508 may be indicative of the accuracy of received location information for a particular delivery location and corresponding received image. For example, if the customer feedback indicates that the delivered item was not received or that the delivery was made to the wrong location, this information may be included to indicate a low quality image, or an incorrect image or location data.

Additionally, in some examples, depending on the type and characteristics of the machine learning model 162, when preparing training data 504, the received images 510 to be used as a training data 504 may be manually separated into high-quality images that are considered to include sufficient information such that the associated received location information 512 may be considered trustworthy, and low-quality images that do not include sufficient information for trusting the associated received location information 512. Alternatively, such as in the case of training a neural network, the manual separation of the training data may not be necessary, and other indications of accuracy may be relied on instead, such as customer feedback or lack thereof, multiple deliveries to the same delivery location resulting in substantially the same location information 512, and so forth. Further, while several types of training data 504 that may be used by the model building program 502 are illustrated in this example, in other examples, other or additional types of information may be used by the model building program 502, as will be apparent to those of skill in the art having the benefit of the disclosure herein.

Following training of the machine learning model 162, the machine learning model 162 may be tested and validated using another portion of the training data 504 such as from a different set of past orders or the like. As indicated at 516, following testing and validation, the model building program 502 may deploy the trained and validated machine-learning model (MLM) 162 for use by the mapping information program 158. For example, as indicated at 518, the mapping information program 158 may receive an image from an agent device and may provide the received image as input to the machine-learning model 162. As one example, the machine-learning model 162 may output a decision as to whether the received image includes a threshold level of information about the delivery location and the item delivered such that the associated location information is considered to be trustworthy. For instance, as indicated at 520 based at least in part on the output of the machine-learning model 162, the mapping information program 158 may determine whether to the add location information for valid images to the mapping information database or to discard the location information for images that have been determined to be invalid as not including at least the threshold amount of information.

For those images that have been determined to include the threshold level of information, high-resolution mapping information 522 is added to the mapping information database 148. Subsequently, during a subsequent delivery to the same delivery location, the high resolution mapping information 522 may be provided to agent device(s) 125 to enable navigation to the correct delivery location. Additionally, while the machine learning model 162 has been described as one example of a technique for determining whether the current received location information for a particular location is trustworthy, other techniques, algorithms, decision-making rules, and the like, may additionally or alternatively be used for making this determination. Accordingly, other implementations herein are not limited to use of a machine learning model 162.

Figure 6:
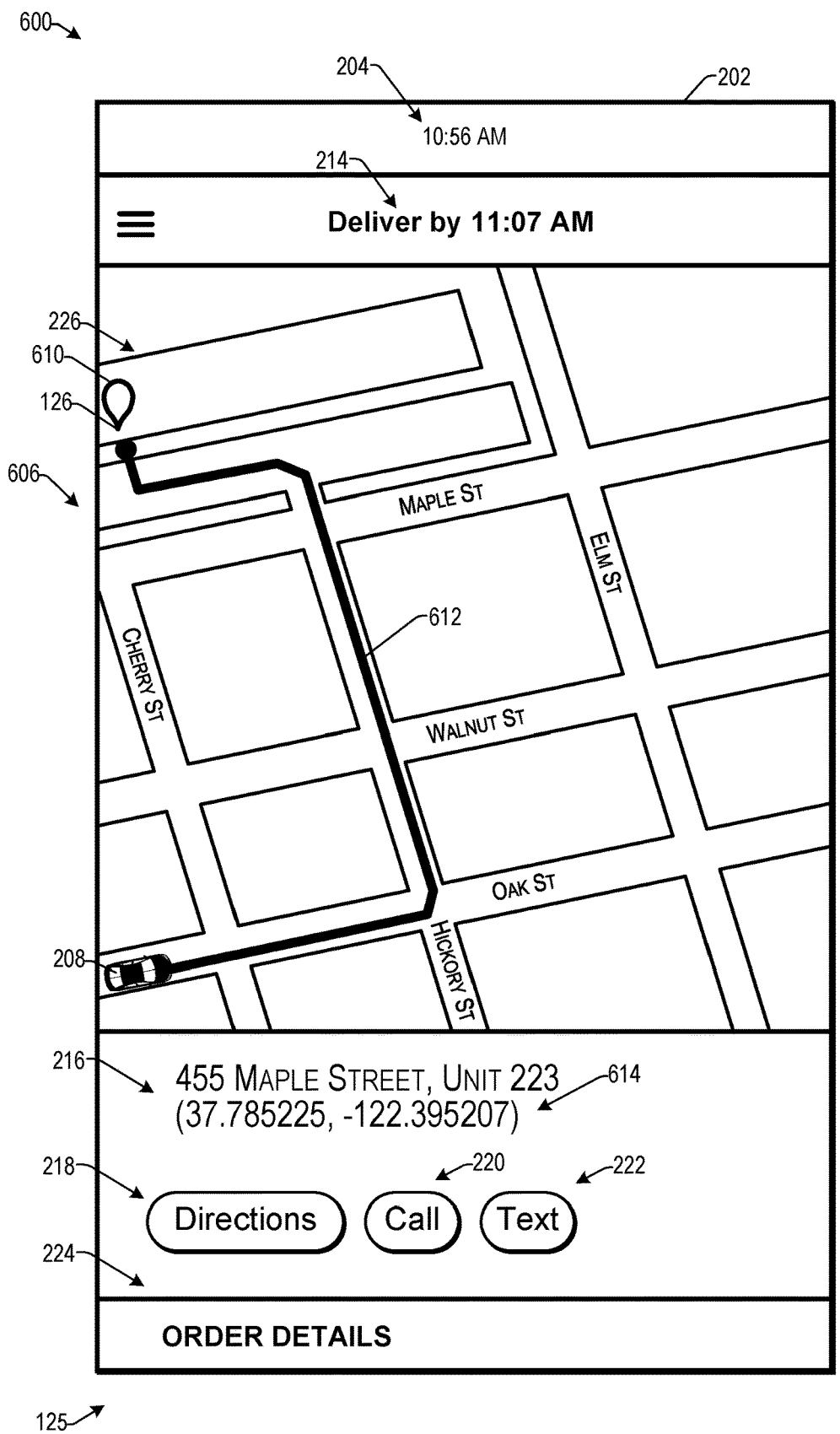
FIG. 6 illustrates an example user interface for presentation on an agent device according to some implementations.

FIG. 6 illustrates an example user interface 600 for presentation on an agent device 125 according to some implementations. In the illustrated example, the agent device 125 may execute the agent application 127 (not shown in FIG. 2) to present the user interface 600 on the display 202 of the agent device 125. For instance, in this case, suppose that the service computing device 102 has already saved the high resolution mapping information for this delivery location in the mapping information database 148 as discussed above, e.g., with respect to FIGS. 2-5. Accordingly, the order processing program 140 may provide the high-resolution mapping information to the agent application 127 and/or to a third party mapping information computing device 152, as discussed above with respect to FIG. 1. In either event, high-resolution mapping information may be used by the agent application 127 to present the user interface 600.

The user interface 600 includes a map 606 that may include the first icon 208 representative of a current indicated location of the agent device 125 in relation to the map 606. For instance, the current location of the agent device 125 may be determined by the agent application 127, such as based on GPS information or other location information received from the agent device 125, e.g., from a GPS receiver included in the agent device 125. The map 606 may further present a second icon 610, such as a pin or the like, corresponding to the delivery location 126 to which the agent is instructed to proceed to perform the delivery. The user interface 600 may further present an indicated route 612 on the map 606 for the agent to follow to navigate from the current location to the delivery location represented by the second icon 610. Accordingly, in this example, the correct delivery location is presented on the map 606 based on the high-resolution mapping information previously generated by the mapping information program 158.

In addition, in some examples, the user interface 200 may optionally present a text version 216 of the delivery location and the associated high definition mapping information, e.g., the previously determined latitude and longitude 614 of the delivery location 126. When the agent arrives at the delivery location 126 and drops off the item 118, the agent 108 may capture an image of the delivery location. As part of the delivery confirmation, the agent application 127 may forward the captured image and associated location information e.g., latitude and longitude to the service computing devices 102. As described above, the image may be input to the machine learning model 162 to determine whether to add the newly received location information to the mapping information database.

As mentioned above, there may be slight variations in latitude and longitude readings received from various different agent devices 125. Accordingly, the latitude and longitude readings for a plurality of different deliveries to the same delivery location may be added averaged, clustered, or the like for determining a consensus latitude and longitude of the delivery location e.g., a likely most accurate location for the delivery location. Consequently, implementations herein may continually improve the accuracy of the high resolution mapping information for the individual delivery locations included in the mapping information database 148. In addition, in some examples, the mapping information database 148 may be provided to the third party mapping information computing device(s) 152 discussed above with respect to FIG. 1 to improve the mapping information provided by the mapping information computing device(s) 152.

Figure 7:
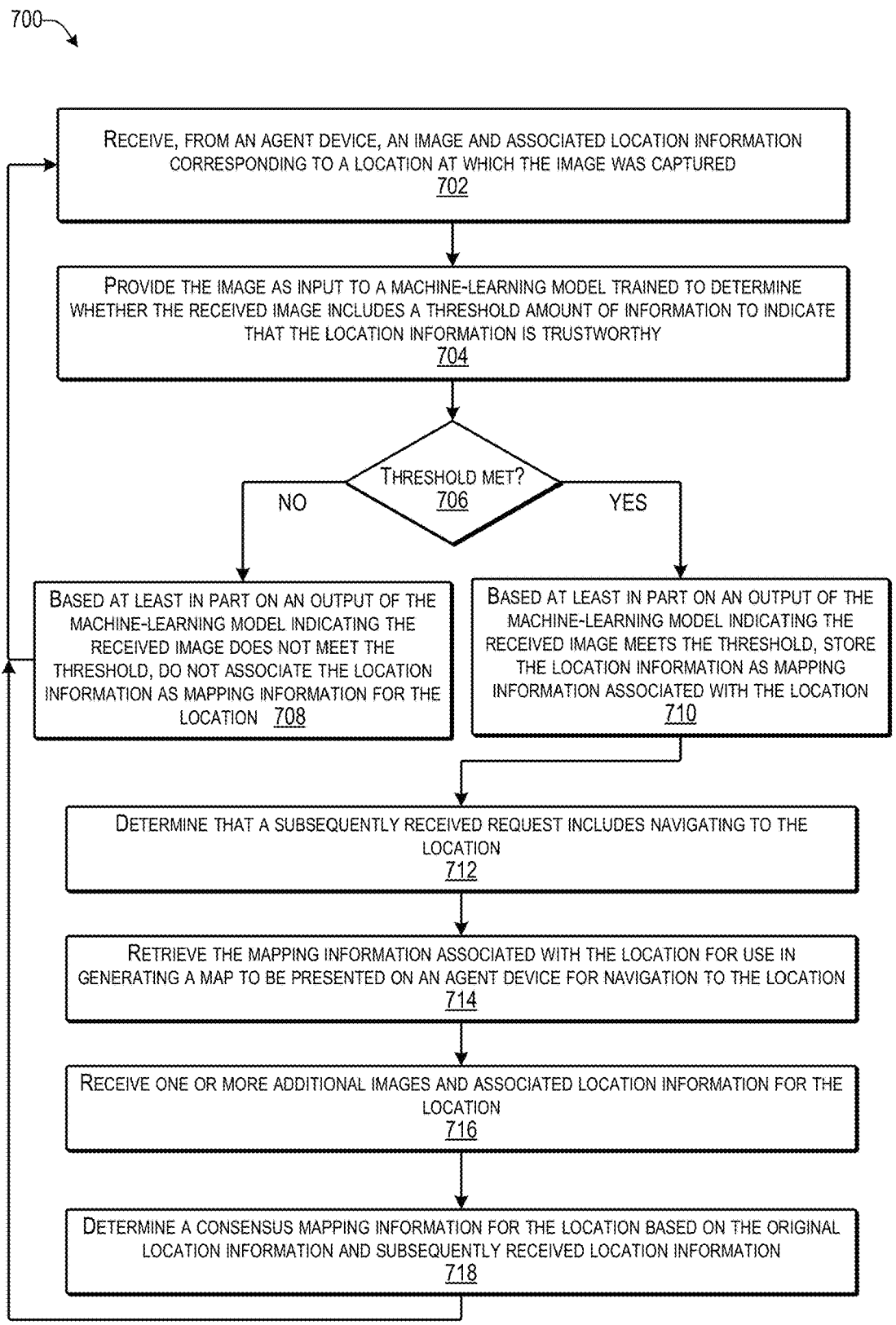
FIG. 7 is a flow diagram illustrating an example process for generating mapping information according to some implementations.

FIG. 7 is a flow diagram illustrating an example process for generating mapping information according to some implementations. For instance, the processes of FIG. 7 is illustrated as collections of blocks in a logical flow diagram, which represents a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, architectures and systems described in the examples herein, although the process may be implemented in a wide variety of other environments, architectures and systems. In some examples, the process 700 may be executed by the service computing device(s) 102, or by one or more other computing devices, at least in part by execution of the mapping information program 158.

At 702, the computing device may receive, from an agent device, an image and associated location information corresponding to a location at which the image was captured. For example, the location may be a densely populated housing location or other densely populated structure.

At 704, the computing device may provide the image as input to a machine-learning model trained to determine whether the received image includes a threshold amount of information to indicate that the location information is trustworthy. For example, the threshold amount of information may include at least a portion of a door, a doorframe, a delivered item, and/or a unit number, and so forth, as discussed above, e.g., with respect to FIGS. 4A-4C.

At 706, the computing device may determine whether the output of the machine-learning model indicates that the threshold is met. If so, the process goes to 710. If not, the process goes to 708.

At 708, based at least in part on an output of the machine-learning model indicating the received image does not meet the threshold, the computing device may not associate the location information as mapping information for the location. For example, the computing device may subsequently discard the location information.

At 710, based at least in part on an output of the machine-learning model indicating the received image meets the threshold, the computing device may store the location information as mapping information associated with the location. As mentioned above, various features in the received image may weigh in favor of the received image meeting the threshold, such as whether the image includes a unit number or other alphanumeric identifying information, whether any recognized unit number in the image matches a unit number provided by the customer, whether the image includes an entrance, whether the image includes a door, doorframe, and/or the delivered item, and so forth. Further, the example features listed above are non-limiting, and additional or alternative features may be used in other examples.

At 712, the computing device may determine that a subsequently received request includes navigating to the location.

At 714, the computing device may retrieve the mapping information associated with the location for use in generating a map to be presented on an agent device for navigation to the location.

At 716, the computing device may receive one or more additional images and associated location information for the location.

At 718, the computing device may determine a consensus mapping information for the location based on the original location information and subsequently received location information. For example, the computing device may take an average of the received latitudes and longitudes, respectively, may perform clustering to eliminate outliers, or the like to determine a most likely accurate latitude and longitude for the location.

Figure 8:
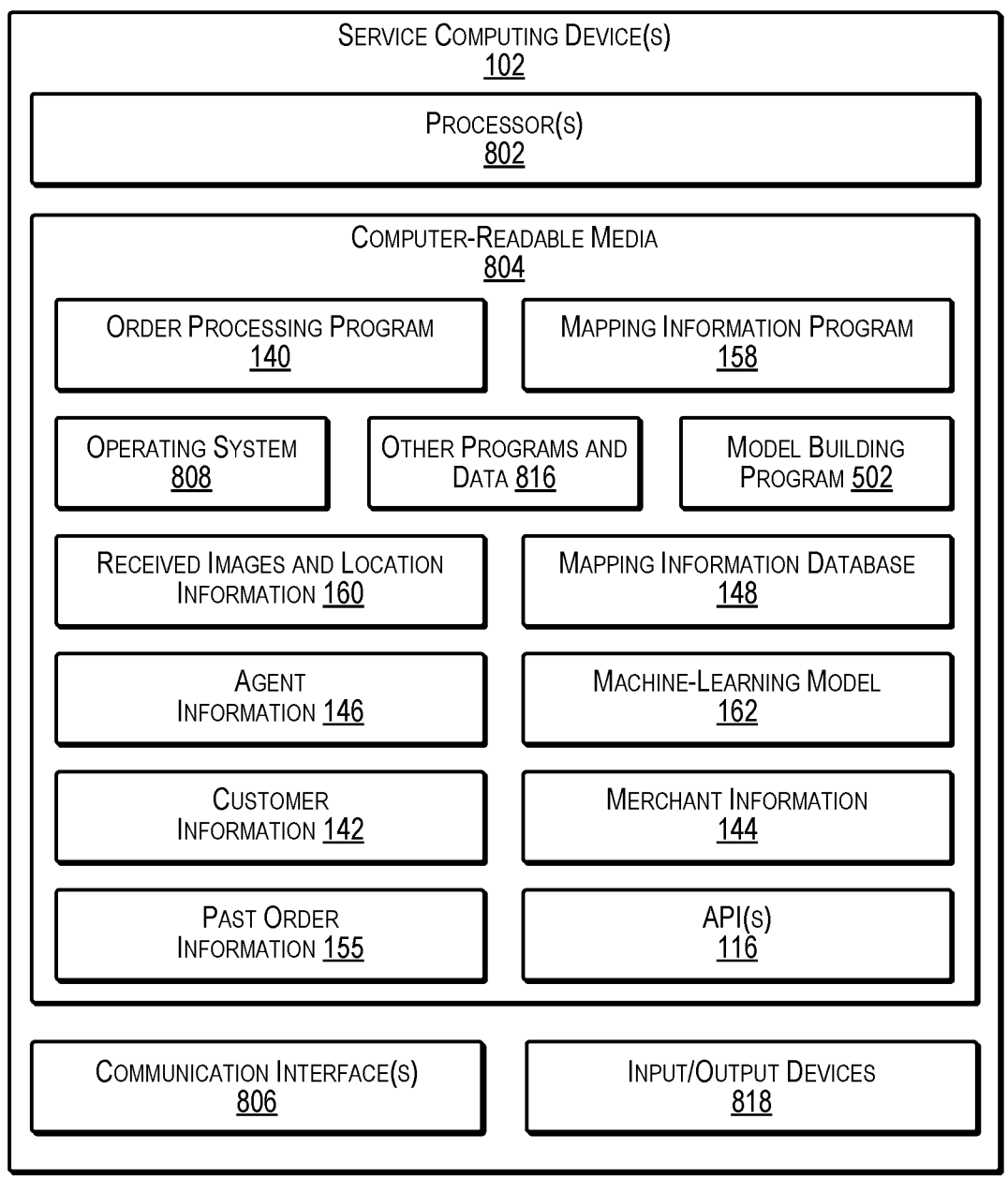
FIG. 8 illustrates select components of one or more example service computing devices according to some implementations.

FIG. 8 illustrates select components of the service computing device 102 that may be used to implement some functionality of the agent management and order processing services described herein. The service computing device 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may additionally or alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the order processing program 140, the mapping information program 158, and the model building program 502, as discussed above. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store the received images and location information 160, the mapping information database 148, the agent information 146, the customer information 142, the merchant information 144, and the past order information 155. Some or all of this information may be maintained in one or more relational databases or any other suitable type of databases or other data structure(s), as will be apparent to those of skill in the art having the benefit of the disclosure herein. Furthermore, the computable readable media 804 may store the machine learning model 162 and the one or more APIs 116, such as information and libraries related to the one or more APIs 116. The service computing device 102 may also include or maintain other functional components and data not specifically shown in FIG. 8, such as other programs and data 816, which may include programs, applications, modules, drivers, etc., and the data used or generated by the functional components. Further, the service computing device 102 may include many other logical, programmatic and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks, as well as close-range communications such as BLUETOOTH® and the like, as additionally enumerated elsewhere herein.

The service computing device 102 may further be equipped with various input/output (I/O) devices 818. Such I/O devices 818 may include a display, various user interface controls (e.g., buttons, joystick, keyboard, mouse, touch screen, etc.), audio speakers, connection ports and so forth.

Figure 9:
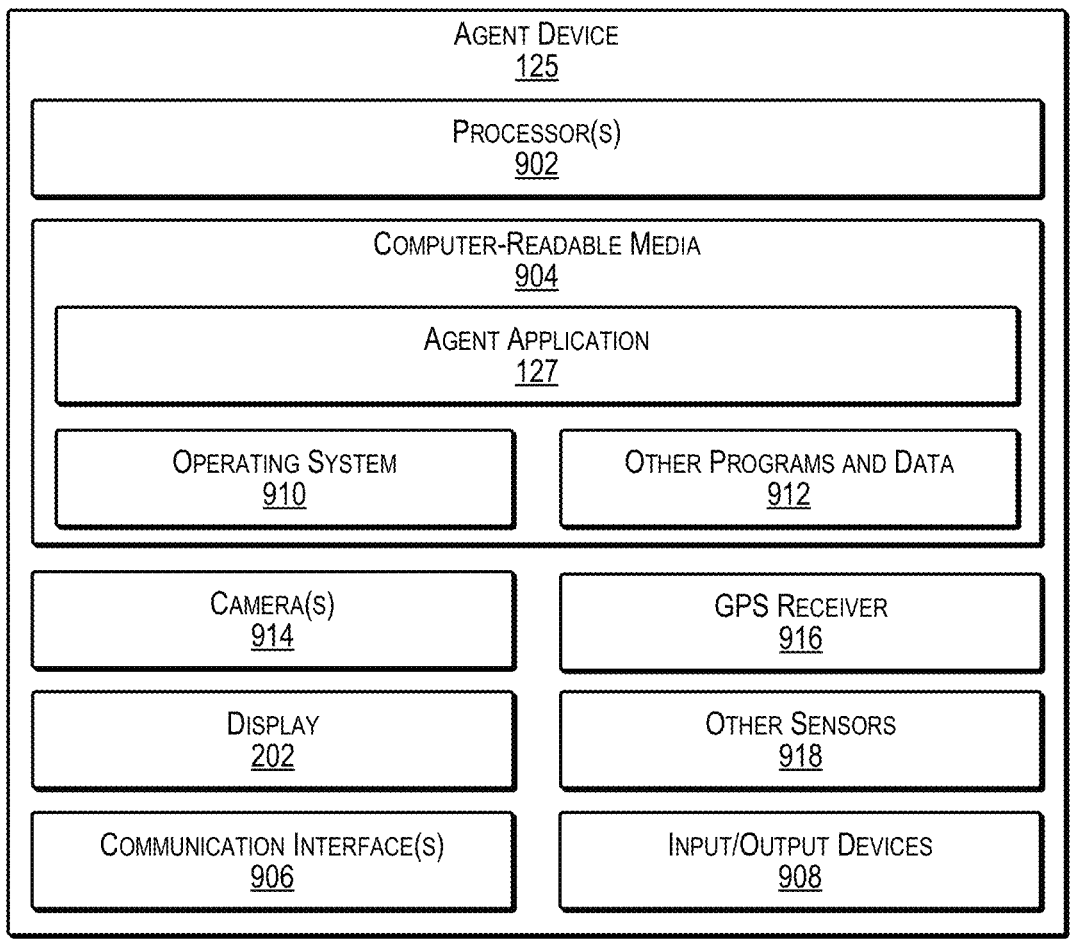
FIG. 9 illustrates select components of an example agent device according to some implementations.

FIG. 9 illustrates select example components of the agent device 125 that may implement the functionality described above according to some examples. The agent device 125 may be any of a number of different types of portable computing devices. Some examples of the agent device 125 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 9, the agent device 125 includes components such as at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the agent device 125, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 904 may include, but is not limited to, RAM, ROM, EEPROM, flash memory, solid-state storage, magnetic disk storage, optical storage, and/or other computer-readable media technology. Further, in some cases, the agent device 125 may access external storage, such as storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, programs or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the agent device 125. Functional components of the agent device 125 stored in the computer-readable media 904 may include the agent application 127, as discussed above, which may present the agent with one or more user interfaces, some examples of which are described above. Additional functional components may include an operating system 910 for controlling and managing various functions of the agent device 125 and for enabling basic user interactions with the agent device 125.

In addition, the computer-readable media 904 may also store data, data structures and the like, that are used by the functional components. Depending on the type of the agent device 125, the computer-readable media 904 may also optionally include other functional components and data, such as other programs and data 912, which may include applications, modules, drivers, etc., and the data used or generated by the functional components. Further, the agent device 125 may include many other logical, programmatic and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 9 further illustrates that the agent device 125 may include the display 202. Depending on the type of computing device used as the agent device 125, the display may employ any suitable display technology. In some examples, the display 202 may have a touch sensor associated with the display 202 to provide a touchscreen display configured to receive touch inputs for enabling interaction with a user interface presented on the display 202.

The agent device 125 may further include the one or more I/O devices 908. The I/O devices 908 may include speakers, a microphone, and various user controls (e.g., buttons, a joystick, a keyboard, a keypad, etc.), a haptic output device, and so forth.

The agent device 125 may further include one or more cameras 914 that may be used for capturing images with the agent device 125. For instance, the camera may be accessed by the agent application 139 when capturing the images described herein. Alternatively, a separate native camera application may be included with the other programs and data 912 and may be used for capturing the images described herein.

Other components included in the agent device 125 may include various types of sensors, which may include a GPS receiver 916 able to indicate location information to the agent application 127, the operating system 910, and/or the other programs 912. The agent device 125 may further include other sensors 918, such as an altimeter, accelerometer, gyroscope, compass, proximity sensor, and the like. Additionally, the agent device 125 may include various other components that are not shown, examples of which include removable storage, a power source, such as a battery and power control unit, and so forth.

Further, the customer device 132 and/or the merchant device 128 may include hardware structures and components similar to those described for the agent device, but with one or more different functional components. For example, the customer device 132 and the merchant device 128 may include the customer application 134 and the merchant application 130, respectively, instead of the agent application 127.

Various instructions, methods and techniques described herein may be considered in the general context of computer-executable instructions, such as programs stored on computer-readable media, and executed by the processor(s) herein. Generally, programs include applications, routines, modules, objects, components, data structures, executable code, etc., for performing particular tasks or implementing particular abstract data types. These programs and the like may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more processors; and
   one or more computer-readable media storing instructions executable to configure the one or more processors to perform operations including:
      receiving, by the one or more processors, from an agent device, a first image and associated first latitude and longitude information corresponding to a location at which the first image was captured;
      providing, by the one or more processors, the first image as input to a machine-learning model previously trained to determine whether the received first image includes a threshold amount of information to indicate that the associated first latitude and longitude information indicate a location of a delivery location corresponding to the received first image;
      based on a first output of the machine-learning model indicating that the first image satisfies the threshold, storing, by the one or more processors, the associated first latitude and longitude information as mapping information associated with the delivery location;
      receiving, by the one or more processors, over time, from respective agent devices, a plurality of second images and associated respective second latitude and longitude information, the respective second latitude and longitude information associated with at least some of the second images differing from at least one of the first latitude and longitude information or other ones of the respective second latitude and longitude information;
      based at least in part on respective outputs of the machine-learning model indicating that the plurality of received second images satisfy the threshold amount of information, storing, by the one or more processors, the associated respective second latitude and longitude information for each respective second image as additional mapping information associated with the delivery location; and
      determining, by the one or more processors, based on at least one of averaging or clustering of the first latitude and longitude information and the respective second latitude and longitude information associated with the plurality of second images, a consensus location for the delivery location.

2. The system as recited in claim 1, the operations further comprising:
   determining that a subsequently received request for an item is for delivery to the delivery location; and
   retrieving the consensus location as the mapping information associated with the delivery location for use in generating a map to be presented on an agent device for delivery of the item to the delivery location.

3. The system as recited in claim 1, the operations further comprising:
   receiving feedback indicating that an item associated with one of the received second images was not received or was in a wrong location; and
   removing the associated respective second latitude and longitude information from being associated with the delivery location as mapping information.

4. The system as recited in claim 1, the operations further comprising:
   receiving another image and different associated latitude and longitude for a different delivery location;
   providing the other image as input to the machine-learning model; and
   based at least in part on an output of the machine-learning model indicating that the other image fails to satisfy the threshold, sending, by the one or more processors, to an agent device that sent the other image, an instruction to capture an additional image corresponding to the different delivery location.

5. The system as recited in claim 1, the operations further comprising:
   receiving another image and different associated latitude and longitude for a different delivery location;
   providing the other image as input to the machine-learning model; and
   based at least in part on an output of the machine-learning model indicating that the other image does not meet the threshold, excluding the different associated latitude and longitude information from being associated with mapping information for the different delivery location.

6. The system as recited in claim 1, the operations further comprising training the machine learning model using a plurality of images of past delivery locations for a plurality of past deliveries to densely populated structures.

7. The system as recited in claim 1, wherein the threshold amount of information includes a delivered item and at least one of an entrance portion, a door portion, or a unit number.

8. A method comprising:
   receiving, by one or more processors, a first image and associated first location information corresponding to a location at which the first image was captured;
   providing, by the one or more processors, the first image as input to a machine-learning model previously trained to determine whether the received first image includes a threshold amount of information to indicate that received first location information indicates a location corresponding to the received first image;
   based on a first output of the machine-learning model indicating that the first image satisfies the threshold, storing, by the one or more processors, the associated first location information as mapping information associated with the location;
   receiving, by the one or more processors, over time, from respective agent devices, a plurality of second images and associated respective second location information, the respective second location information associated with at least some of the second images differing from at least one of the first location information or other ones of the respective second location information;

based at least in part on respective outputs of the machine-learning model indicating that the plurality of received second images satisfy the threshold amount of information, storing, by the one or more processors, the associated respective second location information for each respective second image as additional mapping information associated with the location; and determining, by the one or more processors, based on at least one of averaging or clustering of the first location information and the respective second location information associated with the plurality of second images, a consensus location for the location.

9. The method as recited in claim 8, further comprising:
determining that a subsequently received request includes navigating to the location; and
retrieving the consensus location as the mapping information associated with the location for use in generating a map to be presented on an agent device for navigation to the location.

10. The method as recited in claim 8, further comprising:
receiving feedback indicating that an item associated with one of the received second images was not received or was in a wrong location; and
removing the associated respective second location information from being associated with the location as mapping information.

11. The method as recited in claim 8, further comprising:
receiving another image and different associated location information for a different location;
providing the other image as input to the machine-learning model; and
based at least in part on an output of the machine-learning model indicating that the other image fails to satisfy the threshold, sending, by the one or more processors, to an agent device that sent the other image, an instruction to capture an additional image corresponding to the different location.

12. The method as recited in claim 8, further comprising:
receiving another image and different associated location information for a different location;
providing the other image as input to the machine-learning model; and
based at least in part on an output of the machine-learning model indicating that the other image does not meet the threshold, excluding the different associated location information from being associated with mapping information for the different location.

13. The method as recited in claim 8, further comprising training the machine learning model using a plurality of images of past delivery locations for a plurality of past deliveries to densely populated structures.

14. The method as recited in claim 8, wherein the threshold amount of information includes a delivered item and at least one of an entrance portion, a door portion, or a unit number.

15. A non-transitory computer-readable medium maintaining instructions executable to configure one or more processors to perform operations comprising:
receiving a first image and associated first location information corresponding to a location at which the first image was captured;
providing the first image as input to a machine-learning model previously trained to determine whether the received first image includes a threshold amount of information to indicate that the received first location information indicates a location corresponding to the received image;

based on a first output of the machine-learning model indicating that the first image satisfies the threshold, storing, by the one or more processors, the associated first location information as mapping information associated with the location;

based on receiving, over time, from respective agent devices, a plurality of second images and associated respective second location information, the respective second location information associated with at least some of the second images differing from at least one of the first location information or other ones of the respective second location information;

based at least in part on respective outputs of the machine-learning model indicating that the plurality of received second images satisfy the threshold amount of information, storing the associated respective second location information for each respective second image as additional mapping information associated with the location; and determining, based on at least one of averaging or clustering of the first location information and the respective second location information associated with the plurality of second images, a consensus location for the location.

16. The non-transitory computer-readable medium as recited in claim 15, the operations further comprising:
determining that a subsequently received request includes navigating to the location; and
retrieving the consensus location as the mapping information associated with the location for use in generating a map to be presented on an agent device for navigation to the location.

17. The non-transitory computer-readable medium as recited in claim 15, the operations further comprising:
receiving feedback indicating that an item associated with one of the received second images was not received or was in a wrong location; and
removing the associated respective second location information from being associated with the location as mapping information.

18. The non-transitory computer-readable medium as recited in claim 15, the operations further comprising:
receiving another image and different associated location information for a different location;
providing the other image as input to the machine-learning model; and
based at least in part on an output of the machine-learning model indicating that the other image fails to satisfy the threshold, sending, to an agent device that sent the other image, an instruction to capture an additional image corresponding to the different location.

19. The non-transitory computer-readable medium as recited in claim 15, the operations further comprising:
receiving another image and different associated location information for a different location;
providing the other image as input to the machine-learning model; and
based at least in part on an output of the machine-learning model indicating that the other image does not meet the threshold, excluding the different associated location information from being associated with mapping information for the different location.

20. The non-transitory computer-readable medium as recited in claim 15, the operations further comprising training the machine learning model using a plurality of images of past delivery locations for a plurality of past deliveries to densely populated structures.

\* \* \* \* \*